(12) United States Patent
Namiki et al.

(10) Patent No.: US 9,703,156 B2
(45) Date of Patent: Jul. 11, 2017

(54) LIQUID CRYSTAL DISPLAY DEVICE

(71) Applicant: Japan Display Inc., Tokyo (JP)

(72) Inventors: Satoshi Namiki, Isumi (JP); Tomokazu Saitou, Oamishirasato (JP); Kouichi Inoue, Mobara (JP)

(73) Assignee: Japan Display Inc., Tokyo (JP)

( * ) Notice: Subject to any disclaimer, the term of this patent is extended or adjusted under 35 U.S.C. 154(b) by 367 days.

(21) Appl. No.: 14/451,707

(22) Filed: Aug. 5, 2014

(65) Prior Publication Data

US 2014/0340618 A1    Nov. 20, 2014

Related U.S. Application Data

(63) Continuation of application No. 13/558,411, filed on Jul. 26, 2012, now Pat. No. 8,804,087.

(30) Foreign Application Priority Data

Jul. 29, 2011    (JP) .................................. 2011-167303

(51) Int. Cl.
*G02F 1/1345*    (2006.01)
*G02F 1/1362*    (2006.01)
(Continued)

(52) U.S. Cl.
CPC .... *G02F 1/13458* (2013.01); *G02F 1/133528* (2013.01); *G02F 1/136204* (2013.01);
(Continued)

(58) Field of Classification Search
CPC ........... G02F 1/13452; G02F 1/136204; G02F 1/133528
See application file for complete search history.

(56) References Cited

U.S. PATENT DOCUMENTS 5,717,190 A    2/1998 Inoue
5,870,160 A    2/1999 Yanagawa et al.
(Continued)

FOREIGN PATENT DOCUMENTS

JP        9-105918        4/1997
JP        2011-49247      3/2011

*Primary Examiner* — Paisley L Arendt
*Assistant Examiner* — Agnes Dobrowolski
(74) *Attorney, Agent, or Firm* — Typha IP LLC

(57) ABSTRACT

A liquid crystal display device in which a liquid crystal layer is sandwiched between a TFT substrate having pixel electrodes and opposed electrodes formed and an opposed substrate, an external conductive film of a transparent electrode is formed on an outer surface of the opposed substrate, and an upper polarizing plate is arranged on the external conductive film. A portion of the external conductive film that is not covered with the upper polarizing plate is electrically connected to a ground potential through a conductive thermocompression bonding tape. The conductive thermocompression bonding tape is configured so that w3<w2<w1 is satisfied, wherein w1 represents a width of the conductive thermocompression bonding tape, w2 represents the width of the conductive thermocompression bonding tape electrically connected to the external conductive film, and w3 represents the width of the conductive thermocompression bonding tape electrically connected to a predetermined portion where the ground potential is provided.

7 Claims, 15 Drawing Sheets

(51) Int. Cl.
*G02F 1/1335* (2006.01)
*G02F 1/1343* (2006.01)
*G02F 1/1333* (2006.01)

(52) U.S. Cl.
CPC .............. *G02F 1/134363* (2013.01); *G02F 2001/133334* (2013.01); *G02F 2001/136218* (2013.01); *G02F 2202/28* (2013.01)

(56) References Cited

U.S. PATENT DOCUMENTS

| | | |
|---|---|---|
| 6,525,786 B1 | 2/2003 | Ono |
| 6,597,414 B1 | 7/2003 | Hasegawa |
| 7,542,105 B2 * | 6/2009 | Sato .................. G02F 1/133528 349/58 |
| 7,663,726 B2 | 2/2010 | Takahashi et al. |
| 7,742,140 B2 * | 6/2010 | Lee .................... G02F 1/134363 349/141 |
| 7,940,348 B2 * | 5/2011 | Nishimura ........ G02F 1/133528 349/162 |
| 8,149,371 B2 * | 4/2012 | Oohira .................. G02F 1/1333 349/112 |
| 8,259,250 B2 | 9/2012 | Sato |
| 2007/0080624 A1 | 4/2007 | Koiwa et al. |
| 2008/0151167 A1 * | 6/2008 | Aota ................. G02F 1/136204 349/139 |
| 2009/0122250 A1 | 5/2009 | Oohira |
| 2010/0026662 A1 | 2/2010 | Oohira |
| 2010/0123864 A1 | 5/2010 | Sugiyama et al. |
| 2011/0051068 A1 | 3/2011 | Kamon et al. |
| 2011/0109829 A1 * | 5/2011 | Mathew ............ G02F 1/133514 349/58 |
| 2011/0199554 A1 * | 8/2011 | Isami .................. G02F 1/13452 349/58 |

\* cited by examiner

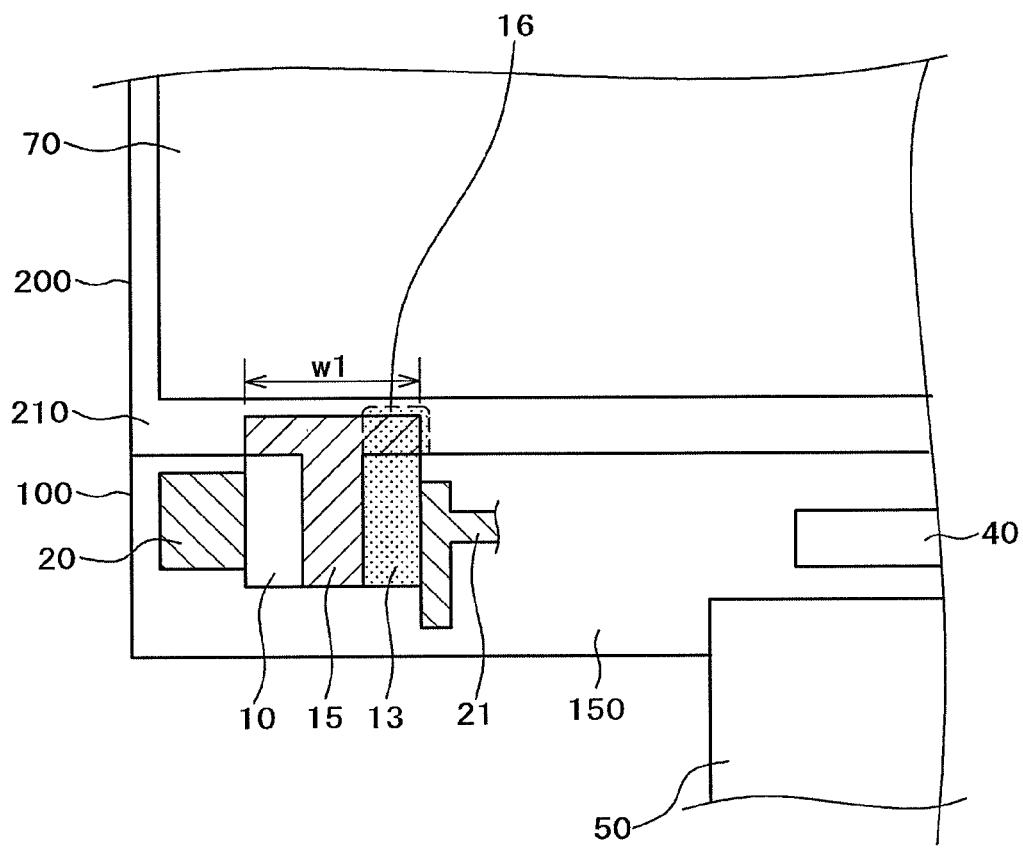

LIQUID CRYSTAL DISPLAY DEVICE

CROSS REFERENCE TO RELATED APPLICATION

This application is a continuation of U.S. application Ser. No. 13/558,411, filed Jul. 26, 2012, the contents of which are incorporated herein by reference.

CLAIM OF PRIORITY

The present application claims priority from Japanese Patent Application JP 2011-167303 filed on Jul. 29, 2011, the content of which is hereby incorporated by reference into this application.

BACKGROUND OF THE INVENTION

Field of the Invention

The present invention relates to a liquid crystal display device, and particularly to a grounding method of a shield conductive film formed on an opposed substrate in an IPS-type liquid crystal display device.

Description of the Related Art

In a liquid crystal display device, there are provided a TFT substrate on which pixel electrodes, thin-film transistors (TFTs) and the like are arranged in matrix, and an opposed substrate which faces the TFT substrate and on which color filters and the like are formed at positions corresponding to the pixel electrodes of the TFT substrate. In addition, liquid crystal is sandwiched between the TFT substrate and the opposed substrate. Further, the transmission of light of liquid crystal molecules is controlled for each pixel to form an image.

Since a liquid crystal display device is flat and lightweight, it has been widely used in various fields ranging from large-sized display devices such as TVs to cellular phones and DSCs (Digital Still Cameras). On the other hand, the characteristic of viewing angles is important in a liquid crystal display device. The characteristic of viewing angles is a phenomenon in which the brightness and chromaticity are changed when viewing the screen from a front or oblique direction. The characteristic of viewing angles is excellent in an IPS (In Plane Switching) type in which liquid crystal molecules are operated by an electric field in the horizontal direction.

In the IPS type, both of pixel electrodes and opposed electrodes are formed on the TFT substrate, and no electrodes are formed inside the opposed substrates. In such a structure, an electric field from outside enters a liquid crystal layer to become noise, deteriorating the image quality.

In order to prevent this problem, Japanese Patent Application Laid-Open No. Hei 9-105918 describes a configuration in which an external conductive film is formed outside an opposed substrate by sputtering ITO (Indium Tin Oxide) and the like and then is grounded, so that the inside of the liquid crystal display device is shielded. As grounding methods of the external conductive film, Japanese Patent Application Laid-Open No. Hei 9-105918 describes a method in which the external conductive film is connected to a metal frame through a conductive material and a method in which the external conductive film is connected to an earth terminal of a surrounding substrate through a cable. U.S. Pat. No. 6,034,757 exists as the corresponding patent of Japanese Patent Application Laid-Open No. Hei 9-105918.

In the method in which the external conductive film is directly connected to a metal frame through a conductive material, the external conductive film and a relatively-large connection area are required in consideration of accuracy of embedding the liquid crystal display device into a frame. However, a polarizing plate is arranged on the opposed substrate, and thus it is difficult to sufficiently provide an area where the external conductive film is connected to an outside earth terminal. In recent years, it has been required to increase a display area while keeping the outer shape of the liquid crystal display device at a predetermined value. In addition, a portion of the external conductive film that is not covered with the polarizing plate, namely, the exposed area of the external conductive film has been further decreased.

On the other hand, in the method in which the external conductive film of the opposed substrate is connected to an earth terminal of a wiring substrate or the like through a cable, it is difficult to secure the reliability of connection between the cable and the external conductive film of the opposed substrate.

An object of the present invention is to ground an external conductive film formed on an opposed substrate with a high degree of reliability in an IPS-type liquid crystal display device.

SUMMARY OF THE INVENTION

The present invention solves the above-described problem, and main features are as follows. Specifically, there is provided a liquid crystal display device in which a liquid crystal layer is sandwiched between a TFT substrate having pixel electrodes and opposed electrodes formed and an opposed substrate having color filters formed, an external conductive film of a transparent electrode is formed on an outer surface of the opposed substrate, and an upper polarizing plate is arranged on the external conductive film, wherein an earth pad connected to the ground is formed on the TFT substrate, a portion of the external conductive film that is not covered with the upper polarizing plate is connected to the earth pad through a conductive thermocompression bonding tape, and $w3<w2<w1$ is satisfied, if a direction parallel with a side of the opposed substrate on which the conductive thermocompression bonding tape is arranged is defined as a width, where $w1$ represents the width of the conductive thermocompression bonding tape, $w2$ represents the width of the conductive thermocompression bonding tape adhering to the external conductive film, and $w3$ represents the width of the conductive thermocompression bonding tape adhering to the earth pad.

More preferably, $1.2w3 \le w2 \le 2.4w3 < w1$ is satisfied in the liquid crystal display device where $w1$ represents the width of the conductive thermocompression bonding tape, $w2$ represents the width of the conductive thermocompression bonding tape adhering to the external conductive film, and $w3$ represents the width of the conductive thermocompression bonding tape adhering to the earth pad.

According to the present invention, it is possible to ground an external conductive film formed on an opposed substrate with a high degree of reliability in an IPS-type liquid crystal display device. Thus, it is possible to realize a highly reliable IPS-type liquid crystal display device that is excellent in the image quality.

BRIEF DESCRIPTION OF THE DRAWINGS

FIG. 8 is a plan view for showing a first comparison example;

DETAILED DESCRIPTION OF THE PREFERRED EMBODIMENT

Figure 15:
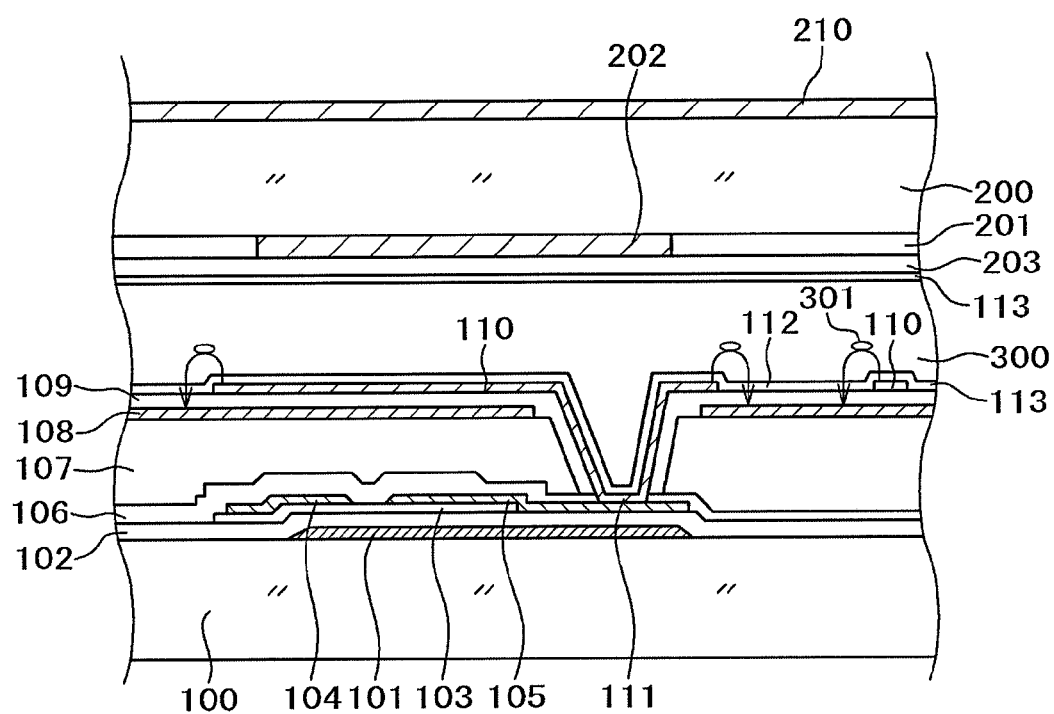
FIG. 15 is a cross-sectional view of a display area of an IPS liquid crystal display device.

Before explaining an embodiment of the present invention, a structure of an IPS-type liquid crystal display device to which the present invention is applied will be described. FIG. 15 is a cross-sectional view for showing a structure in a display area of an IPS-type liquid crystal display device. For the IPS-type liquid crystal display device, various electrode structures have been proposed and put to practical use. The structure shown in FIG. 15 is being widely used today. In simple terms, a comb-like pixel electrode 110 is formed on a planar opposed electrode 108 while sandwiching an insulating film. Liquid crystal molecules 301 are rotated with voltage between the pixel electrode 110 and the opposed electrode 108, so that the transmission of light of a liquid crystal layer 300 is controlled for each pixel to form an image. Hereinafter, the structure shown in FIG. 15 will be described in detail. It should be noted that the present invention will be described using the configuration shown in FIG. 15 as an example. However, the present invention can be applied to an IPS-type liquid crystal display device other than that shown in FIG. 15.

In FIG. 15, a gate electrode 101 is formed on a TFT substrate 100 made of glass. The gate electrode 101 is covered with a gate insulating film 102 made of SiN. A semiconductor layer 103 of an a-Si film is formed on the gate insulating film 102 at the position opposed to the gate electrode 101. The a-Si film forms a channel part of the TFT, and a source electrode 104 and a drain electrode 105 are formed on the a-Si film while sandwiching the channel part. It should be noted that an n+Si layer (not shown) is formed between the a-Si film and the source electrode 104 or the drain electrode 105. The n+Si layer is formed to provide an ohmic contact between the semiconductor layer and the source electrode 104 or the drain electrode 105.

The source electrode 104 is also used by a video signal line, and the drain electrode 105 is connected to the pixel electrode 110. Both of the source electrode 104 and the drain electrode 105 are simultaneously formed on the same layer. The TFT is covered with an inorganic passivation film 106 made of SiN. The inorganic passivation film 106 protects especially the channel part of the TFT from impurities 401. On the inorganic passivation film 106, formed is an organic passivation film 107. The organic passivation film 107 functions to flatten the surface as well as to protect the TFT, and thus the thickness thereof is largely formed. The thickness thereof ranges from 1 μm to 4 μm.

The opposed electrode 108 is formed on the organic passivation film 107. The opposed electrode 108 is formed by sputtering ITO (Indium Tin Oxide) of a transparent conductive film on the entire display area. Specifically, the opposed electrode 108 is formed in a planar shape. The opposed electrode 108 is formed on the entire surface by sputtering, and then only a through-hole 111 conducting the pixel electrode 110 and the drain electrode 105 to each other is formed by etching the opposed electrode 108.

The opposed electrode 108 is covered with an upper insulating film 109 made of SiN. Following the formation of the upper insulating film 109, the through-hole 111 is formed by etching. The through-hole 111 is formed by etching the inorganic passivation film 106 while using the upper insulating film 109 as a resist. Thereafter, ITO serving as the pixel electrode 110 is formed by sputtering while covering the upper insulating film 109 and the through-hole 111. The sputtered ITO is patterned to form the pixel electrode 110.

In FIG. 15, the pixel electrode 110 is formed in a comb-like shape, and a slit 112 is formed between the comb-like electrodes as shown in FIG. 15. Constant voltage is applied to the opposed electrode 108, and the voltage of a video signal is applied to the pixel electrode 110. When voltage is applied to the pixel electrode 110, lines of electric force are generated as shown in FIG. 15 to rotate the liquid crystal molecules 301 in the line direction of electric force, so that the transmission of light from a backlight is controlled. Since the transmission from the backlight is controlled for each pixel, an image is formed. On the pixel electrode 110, formed is an alignment film 113.

In FIG. 15, an opposed substrate 200 is provided while sandwiching the liquid crystal layer 300. Color filters 201 are formed inside the opposed substrate 200. Red, green, and blue color filters 201 are formed for each pixel to form a color image. A black matrix 202 is formed between the color filters 201 to improve the contrast of an image. The color filters 201 and the black matrix 202 are covered with an overcoat film 203. On the overcoat film 203, formed is the alignment film 113 to set the initial alignment of liquid crystal. A photo-alignment process is performed for the alignment film 113.

As described above, the pixel electrode 110 and the opposed electrode 108 are formed on the TFT substrate 100 in the IPS liquid crystal display device, and no electrodes are formed inside the opposed substrate 200. Thus, an electric field enters the liquid crystal layer 300 or the pixel electrode 110 from outside in this state to generate noise, thus deteriorating the image quality.

In order to prevent this problem, an external conductive film 210 using a transparent conductive film such as ITO is formed outside the opposed substrate 200 in the IPS-type liquid crystal display device, and the external conductive film 210 is grounded to shield the inside of the liquid crystal display device. However, a large part of the surface of the opposed substrate 200 is covered with an upper polarizing plate 70 as will be described later, and the exposed area of the external conductive film 210 is small. Accordingly, it is an important issue to ground the external conductive film 210 with a high degree of reliability.

First Embodiment

Figure 1:
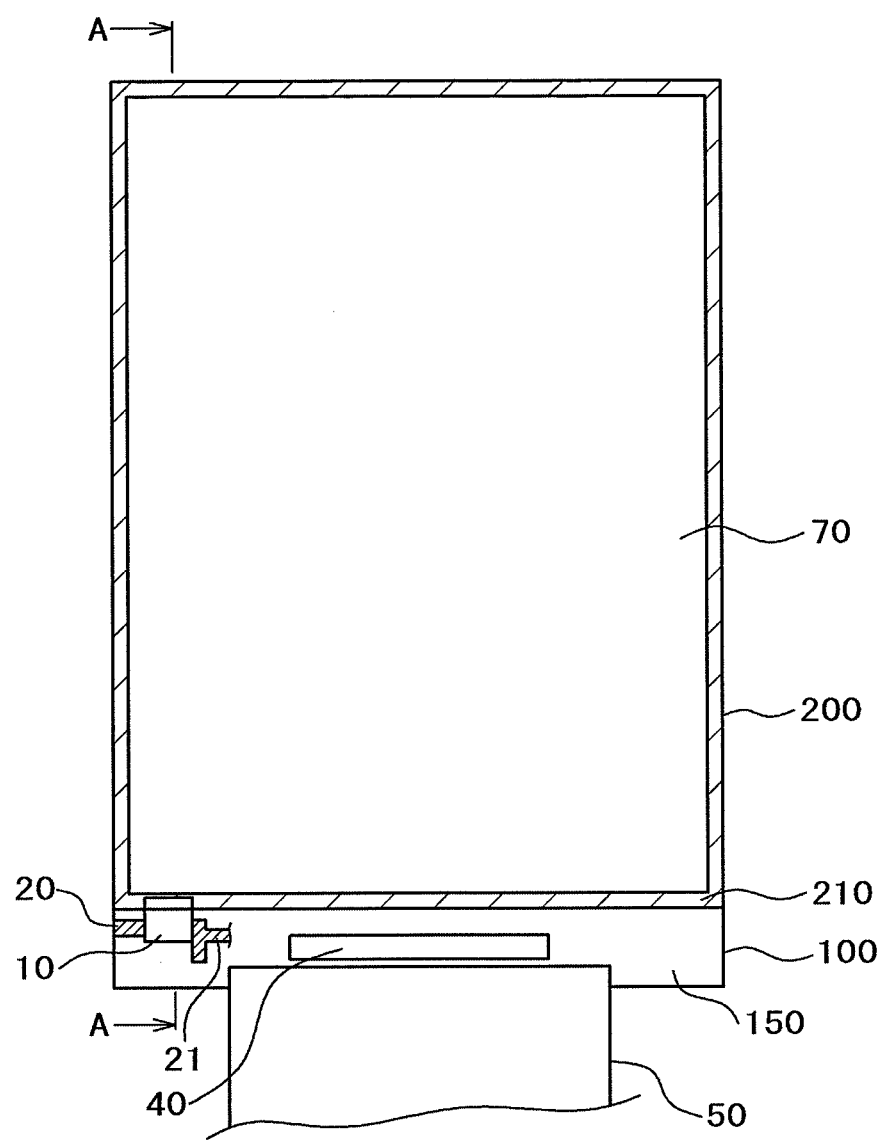
FIG. 1 is a plan view of a liquid crystal display device to which the present invention is applied.

FIG. 1 is a plan view of a liquid crystal display device to which the present invention is applied and which is used for, for example, cellular phones. In FIG. 1, an opposed substrate 200 adheres onto a TFT substrate 100 through a seal member (not shown). The TFT substrate 100 is formed larger in size than the opposed substrate 200, and the area of only the TFT substrate 100 serves as a terminal part 150.

An external conductive film 210 made of ITO is formed outside the opposed substrate 200. On the ITO, attached is an upper polarizing plate 70. As shown in FIG. 1, the upper polarizing plate 70 covers a large part of the opposed substrate 200, and the external conductive film 210 is slightly exposed at peripheral areas. The peripheral small areas need to be grounded by being connected to an earth pad 20 formed on the TFT substrate 100-side.

In the present invention, the external conductive film 210 exposed around the opposed substrate is connected to the earth pad 20 formed on the TFT substrate 100 using a conductive thermocompression bonding tape 10. The earth pad 20 is connected to an earth terminal of a flexible wiring substrate 50 connected to the terminal part 150 or an earth terminal of an IC driver 40 formed at the terminal part 150 through an earth line 21.

Figure 2:
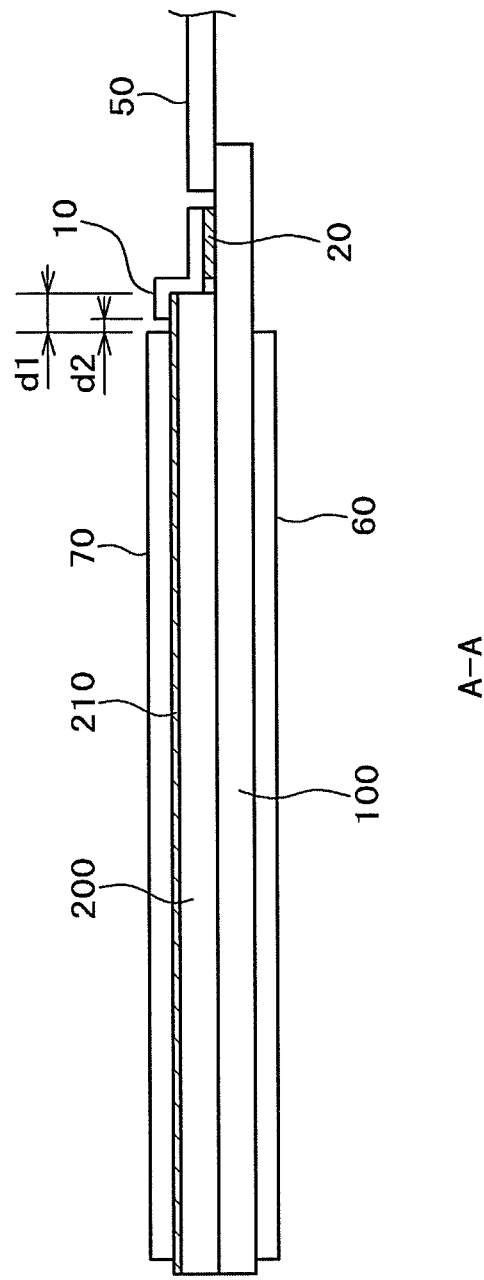
FIG. 2 is a cross-sectional view taken along the line A-A of FIG. 1.

FIG. 2 is a cross-sectional view taken along the line A-A of FIG. 1. In FIG. 2, a liquid crystal layer (not shown) is sandwiched between the TFT substrate 100 and the opposed substrate 200. A lower polarizing plate 60 adheres to the lower side of the TFT substrate 100. The external conductive film 210 made of ITO is formed on the upper side of the opposed substrate 200. The upper polarizing plate 70 is attached on the external conductive film 210.

Figure 4:
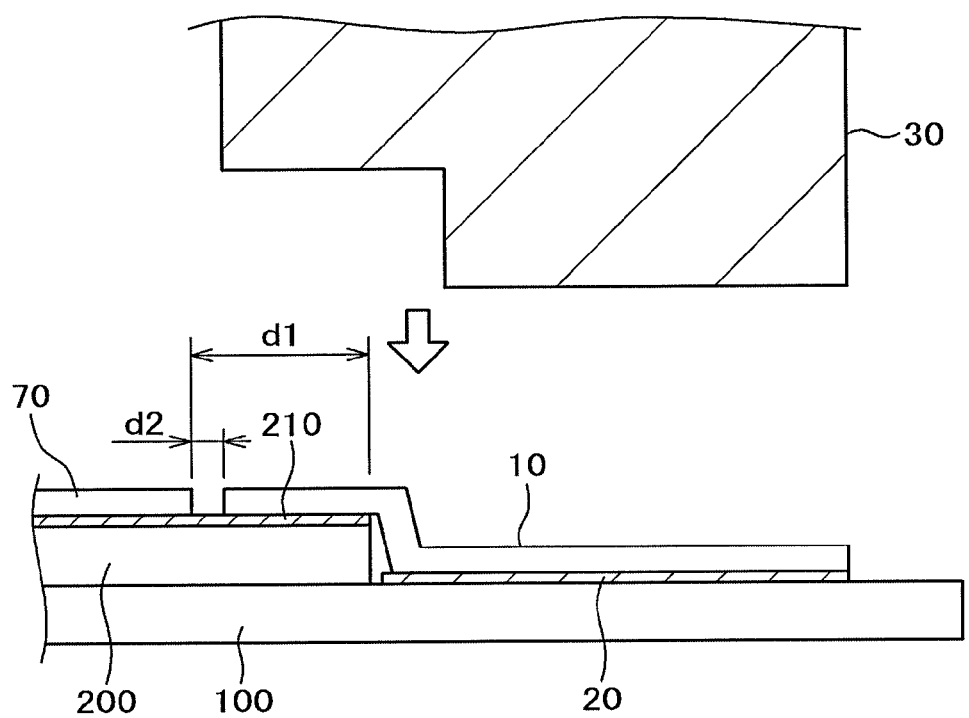
FIG. 4 is a cross-sectional view for showing connection using a conductive thermocompression bonding tape.

In order to shield the inside of the liquid crystal display device, it is necessary to ground the external conductive film 210. Since the earth pad 20 is formed on the TFT substrate 100, the external conductive film 210 of the opposed substrate 200 is connected to the earth pad 20 of the TFT substrate 100 using the conductive thermocompression bonding tape 10. As shown in FIG. 2, a step having the thickness of the TFT substrate 100 is provided between the external conductive film 210 of the opposed substrate 200 and the earth pad 20 of the TFT substrate 100. In order to realize the connection in this state, the conductive thermocompression bonding tape 10 is connected to the external conductive film 210 of the opposed substrate 200 and the earth pad 20 of the TFT substrate 100 using a thermocompression bonding head 30 having a step at its tip end as shown in FIG. 4.

There is a problem in this connection configuration that the width d1 of a portion of the external conductive film 210 of the opposed substrate 200 that is not covered with the upper polarizing plate 70 is as small as about 0.9 mm. Further, the conductive thermocompression bonding tape 10 is connected at temperatures of 120° C. to 140° C. with the thermocompression bonding head 30. If the thermocompression bonding head 30 is brought into contact with the upper polarizing plate 70, an end portion of the upper polarizing plate 70 is broken. Thus, it is necessary to secure an interval d2 of a predetermined value, for example, about 0.4 mm between the upper polarizing plate 70 and the conductive thermocompression bonding tape 10. The value 0.4 mm is a value obtained in consideration of the margin of work.

In such a configuration, the width at which the conductive thermocompression bonding tape 10 can be connected to the external conductive film 210 of the opposed substrate 200 is about 0.5 mm. Thus, the reliability of connection between the external conductive film 210 of the opposed substrate 200 and the conductive thermocompression bonding tape 10 becomes particularly important.

Figure 5A:
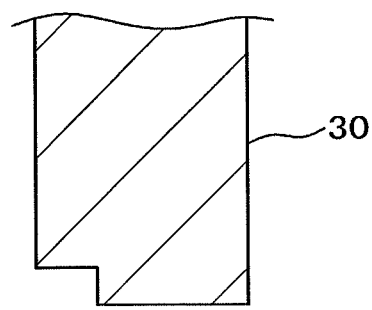
FIGS. 5A and 5B show a thermocompression bonding head used in the present invention.
Figure 5B:
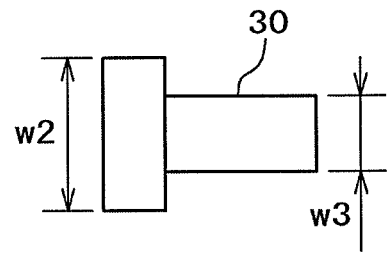

In the present invention, the conductive area and the contact area of the conductive thermocompression bonding tape 10 on the opposed substrate 200 are increased using the thermocompression bonding head 30 as shown in FIGS. 5A and 5B. FIG. 5A is a cross-sectional view of the thermocompression bonding head 30 and FIG. 5B is a bottom view of the thermocompression bonding head 30. In FIG. 5B, the width w2 of a portion connecting to the external conductive film 210 of the opposed substrate 200 is larger than the width w3 of a portion connecting to the earth pad 20 of the TFT substrate 100. The contact area on the external conductive film 210 can be increased by this amount.

Figure 3:
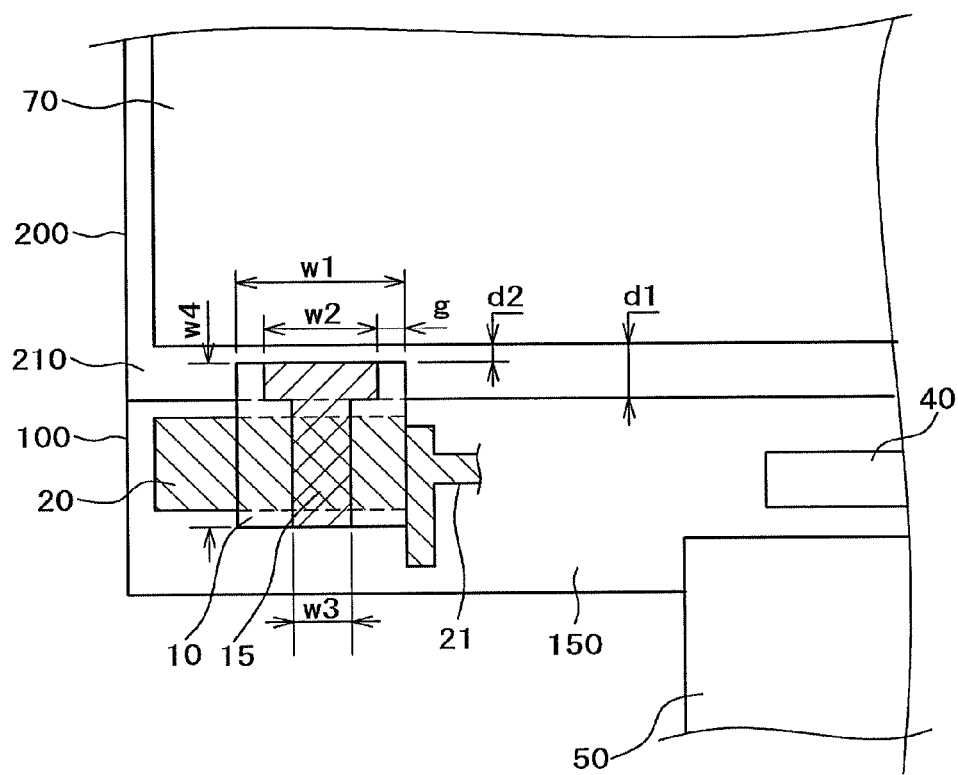
FIG. 3 is a plan view for showing the present invention.

FIG. 3 is a plan view for showing a portion to which the conductive thermocompression bonding tape 10 is connected in such a manner. In FIG. 3, the conductive thermocompression bonding tape 10 connects the external conductive film 210 of the opposed substrate 200 to the earth pad 20 of the TFT substrate 100. The conductive thermocompression bonding tape 10 of FIG. 3 is formed in a square shape, and widths w1 and w4 are, for example, 3 mm. It is obvious that the widths w1 and w4 are different from each other in some cases. Electric conduction and contact are realized not through the entire conductive thermocompression bonding tape but only a part of the conductive thermocompression bonding tape bonded by thermocompression of the thermocompression bonding head 30. Specifically, electric conduction is realized by a conductive area 15 of FIG. 3.

As shown in FIG. 3, the contact and electric conduction of the conductive thermocompression bonding tape 10 is as wide as a width w2 on the external conductive film 210 of the opposed substrate 200 and is as narrow as a width w3 on the earth pad 20 of the TFT substrate 100. In the embodiment, the width w2 is 2 mm and the width w3 is 1 mm. In order to increase adhesive force on the opposed substrate 200, the width w2 needs to be at least 1.2 times the width w3. More preferably, the width w2 needs to be at least twice the width w3.

On the other hand, it is necessary to provide a distance g of at least 0.3 mm from the contact portion or the conductive portion to an end of the conductive thermocompression bonding tape 10. This is because the accuracy of thermocompression work by the thermocompression bonding head 30 is about ±0.2 mm, and it is necessary to provide the distance g of at least 0.1 mm between the an end of thermocompression bonding head 30 and an end of the conductive thermocompression bonding tape 10. When the width w1 is 3 mm and the distance g is 0.3 mm, the width w2 is 2.4 mm. In this case, the width w3 is 1 mm, and thus the width w2 is 2.4 times the width w3.

In FIG. 3, the conductive thermocompression bonding tape 10 is connected to the earth pad 20 on the TFT substrate 100, and the earth pad 20 is connected to the flexible wiring substrate 50 and the like through the earth line 21. Further, the exposed width d1 of the external conductive film 210 of the opposed substrate 200 is 0.9 mm and a distance d2 between an end of the conductive thermocompression bonding tape 10 and an end of the upper polarizing plate 70 is 0.4 mm in FIG. 3.

Figure 6A:
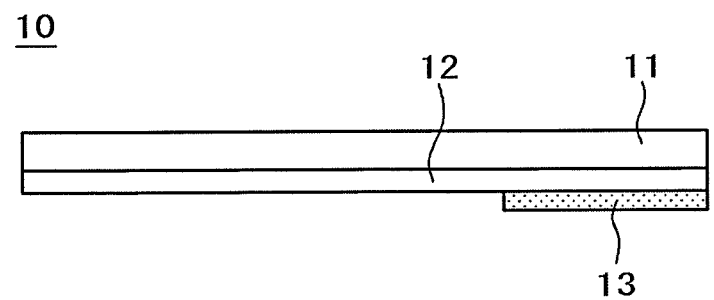
FIGS. 6A and 6B are diagrams each showing the shape of the conductive thermocompression bonding tape.
Figure 6B:
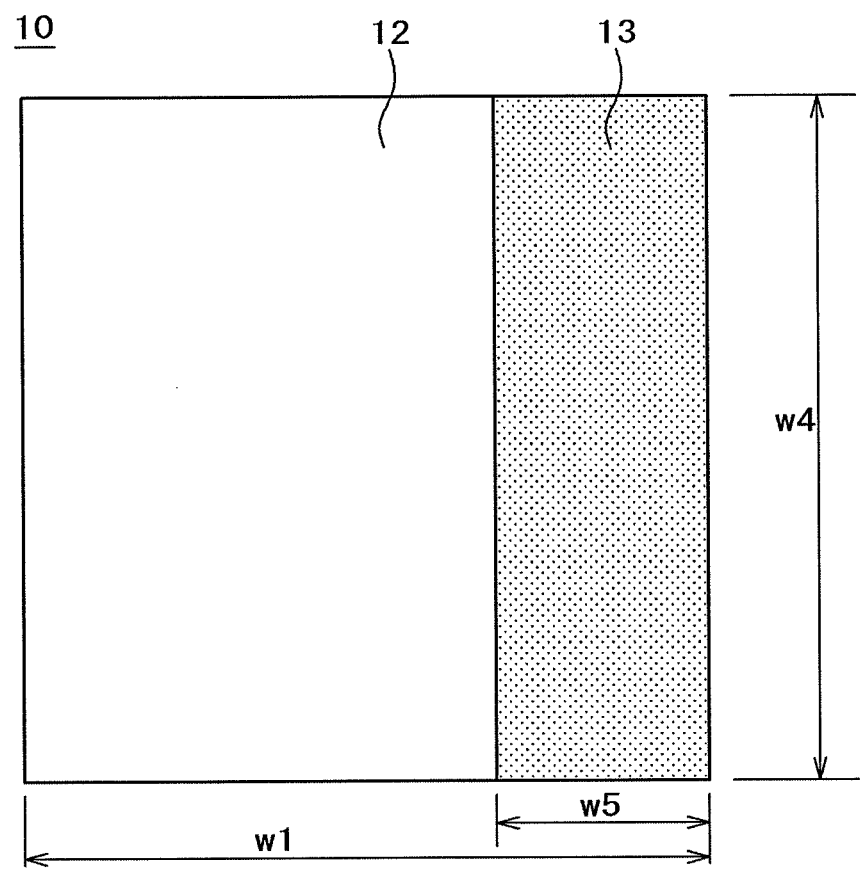

FIGS. 6A and 6B are detailed diagrams each showing an example of the conductive thermocompression bonding tape 10. The conductive thermocompression bonding tape 10 of FIGS. 6A and 6B is largely divided into three parts in the cross-section, specifically, an adhesive tape 11 with a small adhesive force (for example, a thickness of 85 μm), a conductive adhesive sheet 12 (for example, a thickness of 45 μm), and a two-sided adhesive tape 13 (for example, a thickness of 30 μm) in order from the top. Of these layers, it is the conductive adhesive sheet 12 that exhibits the adhesiveness and conductivity by thermocompression.

The two-sided adhesive tape 13 of FIGS. 6A and 6B is used to temporarily attach the conductive thermocompression bonding tape 10 to the TFT substrate 100 or the opposed substrate 200 before thermocompression of the conductive thermocompression bonding tape 10. In FIGS. 6A and 6B, the two-sided adhesive tape 13 is formed across a width w5, and w5/w1 is ⅓ in FIGS. 6A and 6B.

Figure 7:
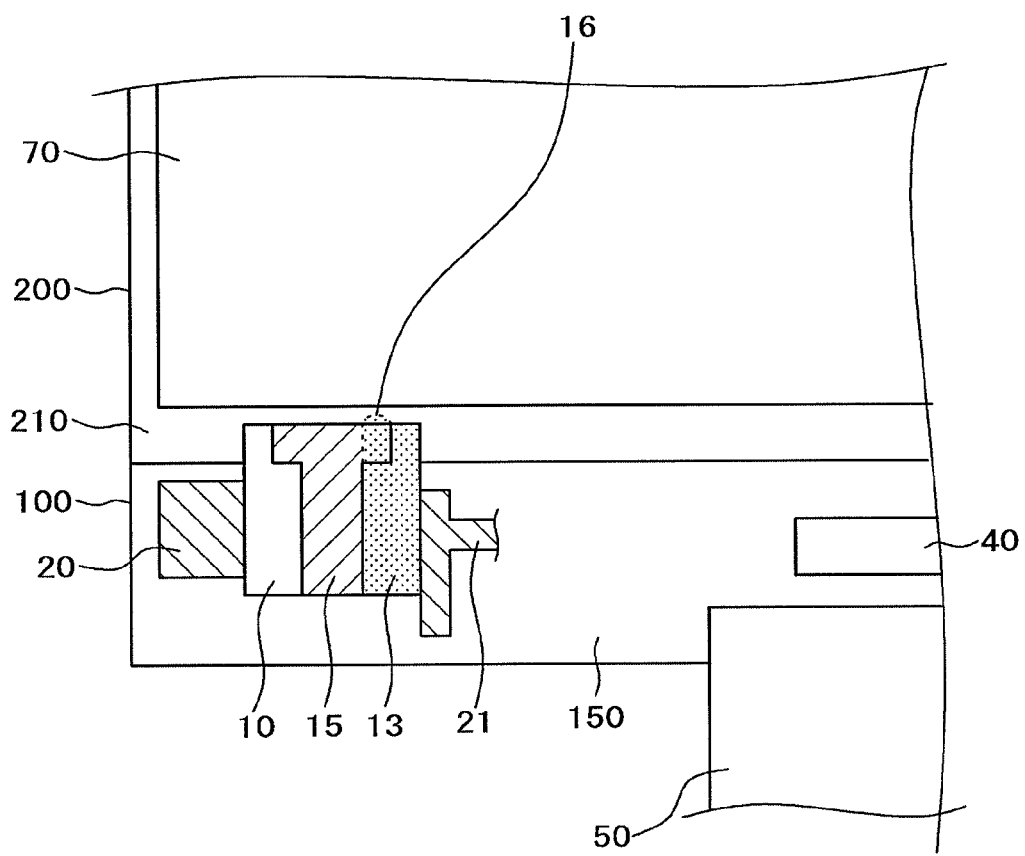
FIG. 7 is a plan view for showing another mode of the present invention.

When the thermocompression bonding head 30 abuts on the area where the two-sided adhesive tape 13 is formed, the two-sided adhesive tape 13 is crashed and protrudes outside. FIG. 7 shows a state in which an area 16 where the two-sided adhesive tape 13 protrudes exists when the thermocompression bonding head 30 of the present invention is used. If the two-sided adhesive tape 13 protrudes, the two-sided adhesive tape 13 adheres to the thermocompression bonding head 30, deteriorating the efficiency of the following work or the adhesive accuracy in some cases. In the connection method of the present invention, the amount of protrusion of the two-sided adhesive tape 13 is extremely small as shown in FIG. 7, and thus the deterioration in the work efficiency and adhesive accuracy can be suppressed to a small degree.

First Comparison Example

Figure 9A:
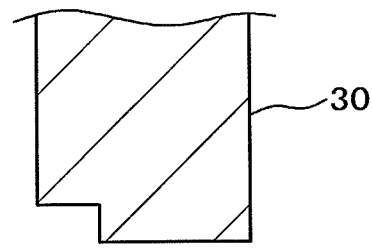
FIGS. 9A and 9B show a thermocompression bonding head used in the first comparison example.
Figure 9B:
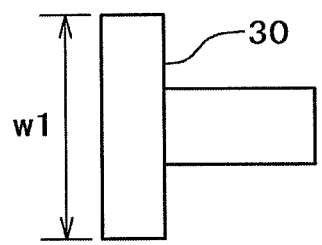

FIGS. 8, 9A and 9B show a first comparison example relative to the present invention. FIG. 8 is an enlarged view of a portion where the conductive thermocompression bonding tape 10 is arranged in the liquid crystal display device, and corresponds to FIG. 3 of the first embodiment. FIG. 8 is different from FIG. 3 in that the width of a portion of the conductive thermocompression bonding tape 10 adhering or conducting to the external conductive film 210 of the opposed substrate 200 is equal to the width w1 of the conductive thermocompression bonding tape 10.

Each of FIGS. 9A and 9B shows the shape of the thermocompression bonding head 30 to connect the conductive thermocompression bonding tape 10 shown in FIG. 8. FIG. 9A is a cross-sectional view thereof, and FIG. 9B is a bottom view thereof. FIGS. 9A and 9B are different from the thermocompression bonding head 30 used in the embodiment in that the width of the head 30 attached to the opposed substrate 200-side is equal to the width w1 of the conductive thermocompression bonding tape 10.

If the width of a portion of the conductive thermocompression bonding tape 10 adhering to the external conductive film 210 is large, the reliability of adhesion between the opposed substrate 200 and the conductive thermocompression bonding tape 10 is enhanced. However, the amount of protrusion of the two-sided adhesive tape 13 becomes large, thus increasing the possibility that the adhesive material adheres to the thermocompression bonding head 30. As a result, the workability of thermocompression or the work accuracy of thermocompression is deteriorated.

Second Comparison Example

Figure 10:
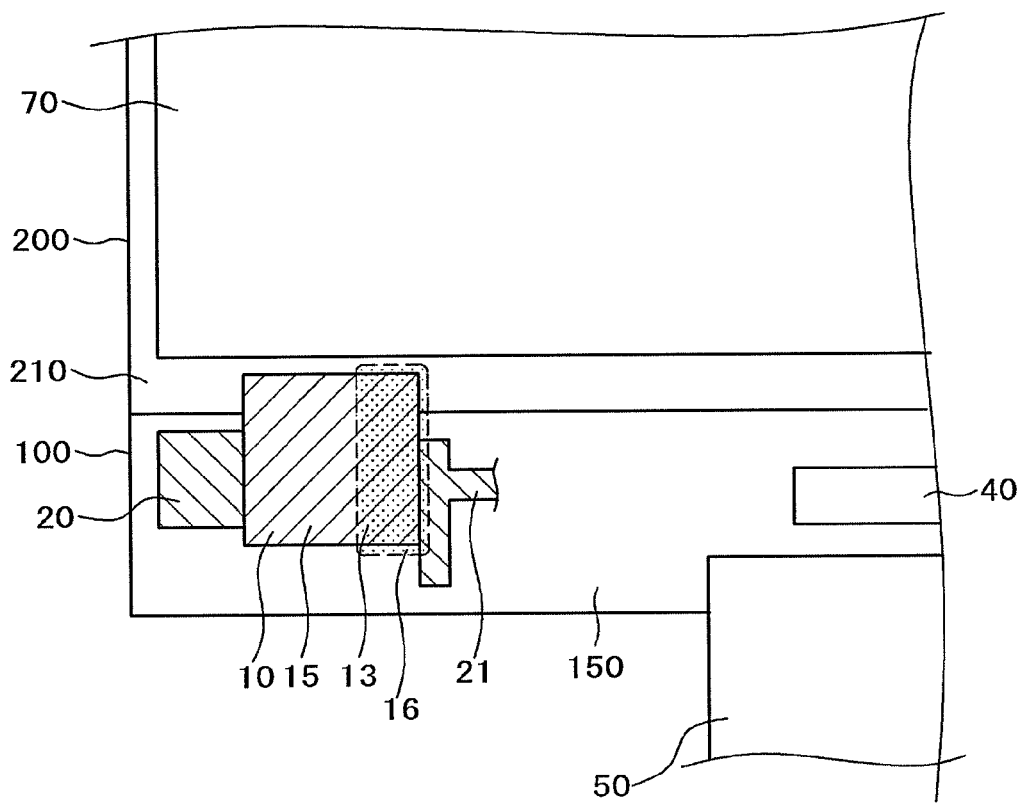
FIG. 10 is a plan view for showing a second comparison example.
Figure 11A:
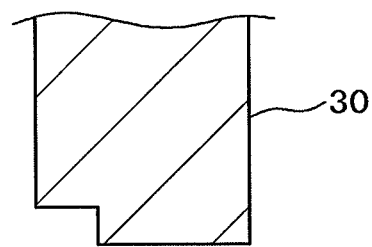
FIGS. 11A and 11B show a thermocompression bonding head used in the second comparison example.
Figure 11B:
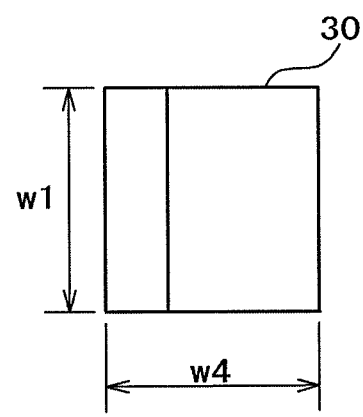

FIGS. 10, 11A and 11B show a second comparison example relative to the present invention. FIG. 10 is an enlarged view of a portion where the conductive thermocompression bonding tape 10 is arranged in the liquid crystal display device, and corresponds to FIG. 3 of the first embodiment. FIG. 10 is different from FIG. 3 in that the thermocompression bonding head 30 is attached to the entire conductive thermocompression bonding tape 10 by thermocompression, and the conductive thermocompression bonding tape 10 is connected to the external conductive film 210 of the opposed substrate 200 and the earth pad 20 of the TFT substrate 100.

Each of FIGS. 11A and 11B shows the shape of the thermocompression bonding head 30 to connect the conductive thermocompression bonding tape 10 shown in FIG. 10. FIG. 11A is a cross-sectional view thereof, and FIG. 11B is a bottom view thereof. In FIG. 11B, the outer shape of the lower surface of the thermocompression bonding head 30 is the same as that of the conductive thermocompression bonding tape 10.

Since the entire conductive thermocompression bonding tape 10 adheres to the external conductive film 210 of the opposed substrate 200 or the earth pad 20 of the TFT substrate 100 in FIG. 10, the reliability of adhesiveness or conduction is enhanced. However, the two-sided adhesive tape 13 largely protrudes from the conductive thermocompression bonding tape 10 as shown in FIG. 10. As a result, the adhesive material 13 adheres to the thermocompression bonding head 30, deteriorating the workability of thermocompression or the work accuracy of thermocompression.

Third Comparison Example

Figure 12:
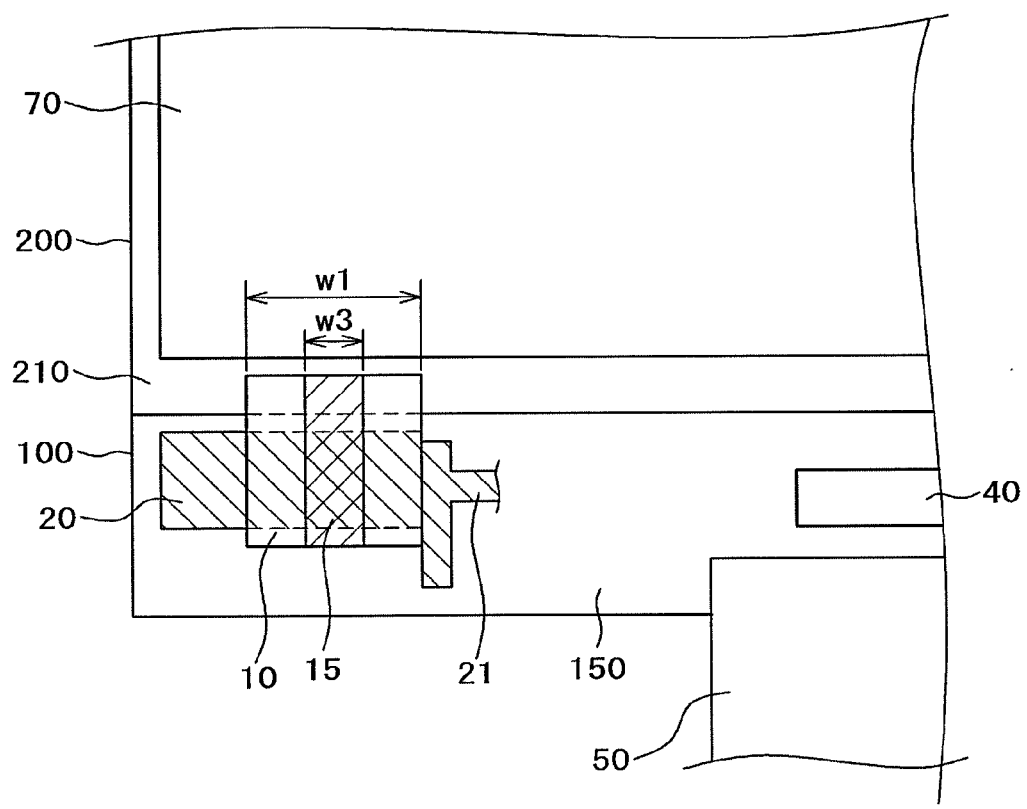
FIG. 12 is a plan view for showing a third comparison example.

FIGS. 12, 13A, 13B and 14 show a third comparison example relative to the present invention. FIG. 12 is an enlarged view of a portion where the conductive thermocompression bonding tape 10 is arranged in the liquid crystal display device, and corresponds to FIG. 3 of the first embodiment. FIG. 12 is different from FIG. 3 in that the conductive thermocompression bonding tape 10 is connected to the external conductive film 210 of the opposed substrate 200 and the earth pad 20 of the TFT substrate 100 through a constant width w3 in the middle.

Figure 13A:
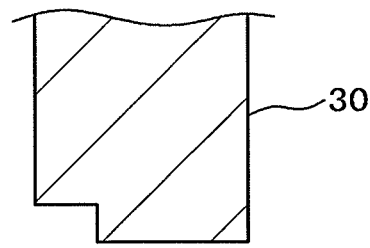
FIGS. 13A and 13B show a thermocompression bonding head used in the third comparison example.
Figure 13B:
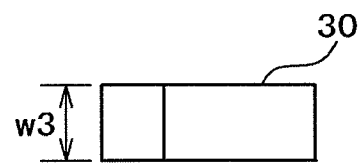

Each of FIGS. 13A and 13B shows the shape of the thermocompression bonding head 30 to connect the conductive thermocompression bonding tape 10 shown in FIG. 12. FIG. 13A is a cross-sectional view thereof, and FIG. 13B is a bottom view thereof. In FIG. 13B, the outer shape of the lower surface of the thermocompression bonding head 30 is not a T shape but a rectangular shape with a width w1. In the comparison example, the width is, for example, 1 mm.

Figure 14:
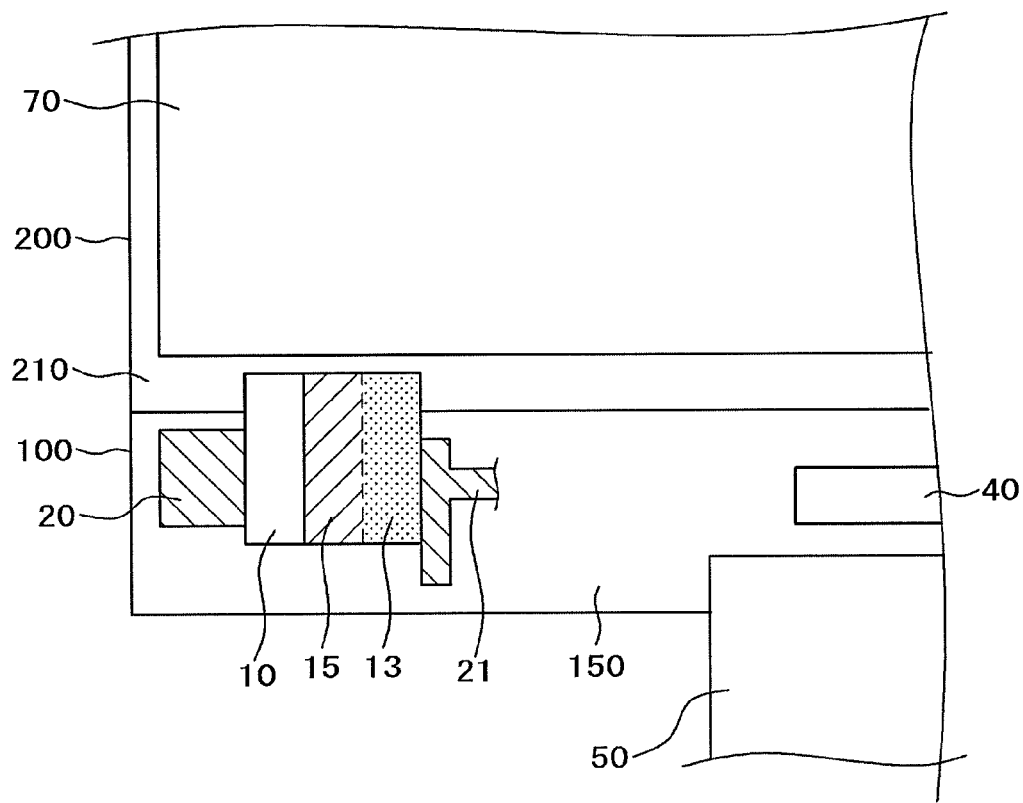
FIG. 14 is a plan view for showing another mode of the third comparison example.

In FIG. 12, the conductive thermocompression bonding tape 10 is connected to the external conductive film 210 of the opposed substrate 200 only through the width w1. Thus, it is impossible to sufficiently secure the reliability of adhesive strength and conduction to the external conductive film 210 of the opposed substrate 200. FIG. 14 shows a state of the two-sided adhesive tape 13 in the conductive thermocompression bonding tape 10 in the third comparison example. In the comparison example, the area of the two-sided adhesive tape 13 of the conductive thermocompression bonding tape 10 is not bonded by thermocompression if the variation of work is not considered. Thus, it is less likely that the two-sided adhesive tape 13 adheres to the thermocompression bonding head 30 to deteriorate the workability of thermocompression or the accuracy of the thermocompression dimension.

What is claimed is:

1. A liquid crystal display device in which a liquid crystal layer is sandwiched between a TFT substrate having pixel electrodes and opposed electrodes formed and an opposed substrate, an external conductive film of a transparent electrode is formed on an outer surface of the opposed substrate, and an upper polarizing plate is arranged on the external conductive film,
   wherein a portion of the external conductive film that is not covered with the upper polarizing plate is electrically connected to a ground potential through a conductive thermocompression bonding tape, and
   wherein the conductive thermocompression bonding tape is configured so that w3<w2<w1 is satisfied, if a direction parallel with a side of the opposed substrate on which the conductive thermocompression bonding tape is arranged is defined as a width, where w1 represents the width of the conductive thermocompression bonding tape, w2 represents the width of the conductive thermocompression bonding tape electrically connected to the external conductive film, and w3 represents the width of the conductive thermocompression bonding tape electrically connected to a predetermined portion where the ground potential is provided to the predetermined portion.

2. The liquid crystal display device according to claim 1, wherein 1.2w3≤w2≤2.4w3<w1 is satisfied, and
   wherein the opposed substrate has color filters formed thereon.

3. The liquid crystal display device according to claim 2, wherein a two-sided adhesive tape for temporary bonding is formed at a part of the conductive thermocompression bonding tape.

4. The liquid crystal display device according to claim 3, wherein the liquid crystal display device is an IPS type liquid crystal display device.

5. The liquid crystal display device according to claim 1, wherein an earth pad electrically connected to the ground potential is formed on the TFT substrate, and
   wherein the portion of the external conductive film that is not covered with the upper polarizing plate is connected to the earth pad through the conductive thermocompression bonding tape.

6. A liquid crystal display device in which a liquid crystal layer is sandwiched between a TFT substrate having pixel electrodes and opposed electrodes formed and an opposed substrate, an external conducive film of a transparent electrode is formed on an outer surface of the opposed substrate, and an upper polarizing plate is arranged on the external conductive film,
   wherein a portion of the external conductive film that is not covered with the upper polarizing plate is electrically connected to a ground potential through a conductive thermocompression bonding tape, and
   wherein w3<w2<w1 is satisfied, if a direction parallel with a side of the opposed substrate on which the conductive thermocompression bonding tape is arranged is defined as a width, where w1 represents the width of the conductive thermocompression bonding tape, w2 represents the width of the conductive thermocompression boding tape electrically connected to the external conductive film, and w3 represents the width of the conductive thermocompression bonding tape electrically connected to a predetermined portion, wherein the ground potential is provided to the predetermined portion.

7. The liquid crystal display device according to claim 6, wherein an earth pad electrically connected to the ground potential is formed on the TFT substrate,
   wherein the portion of the external conductive film that is not covered with the upper polarizing plate is connected to the earth pad through the conductive thermocompression bonding tape, and
   wherein the opposed substrate has color filters formed thereon.

* * * * *